Figure 1:
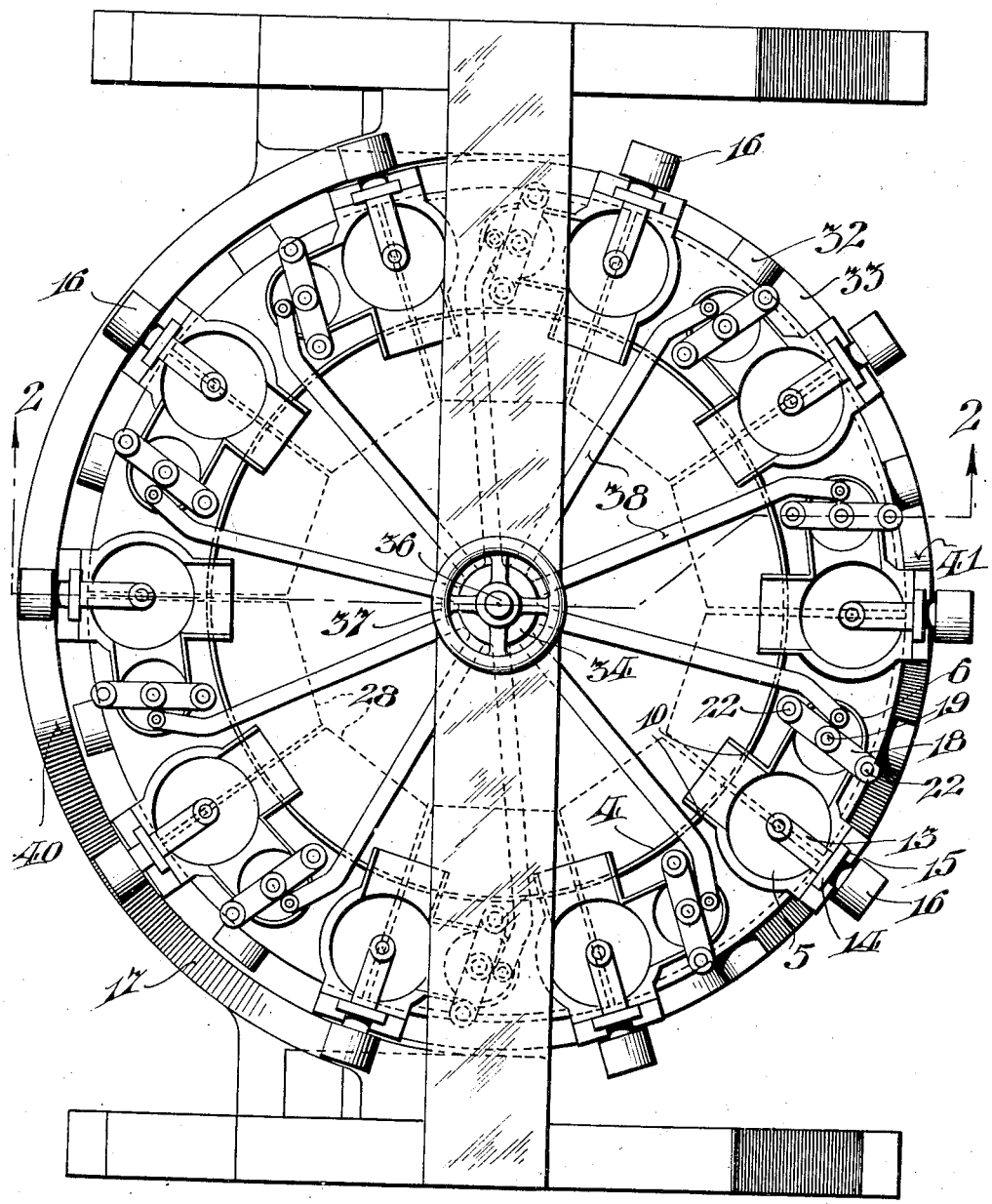

Sept. 4, 1928.

C. H. AYARS 1,683,120

LIQUID MEASURING VALVE

Filed Jan. 16, 1926

3 Sheets-Sheet 1

WITNESSES:

INVENTOR:
Charles H. Ayars,
BY
ATTORNEY.

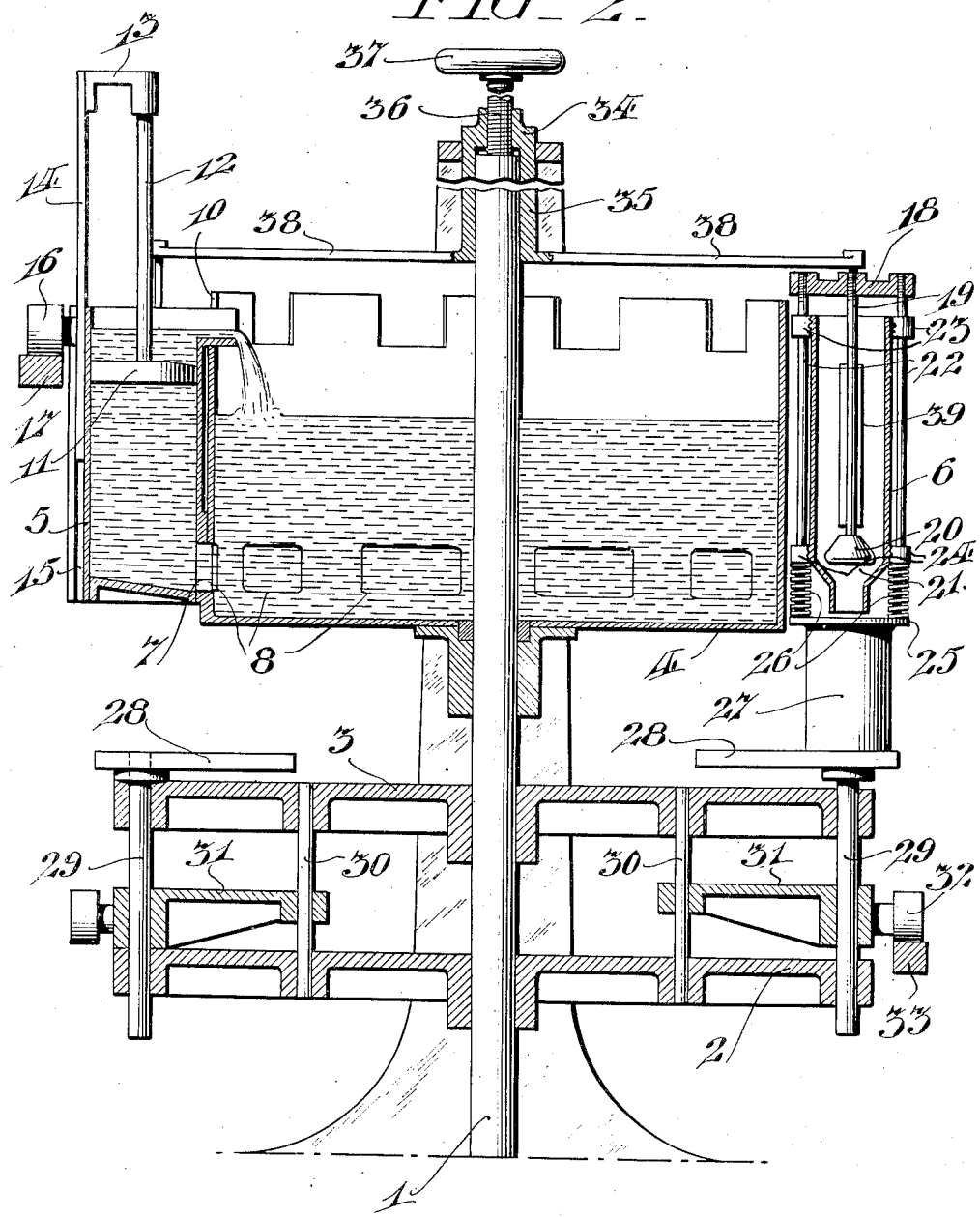

Sept. 4, 1928.
C. H. AYARS
1,683,120
LIQUID MEASURING VALVE
Filed Jan. 16, 1926   3 Sheets-Sheet 3
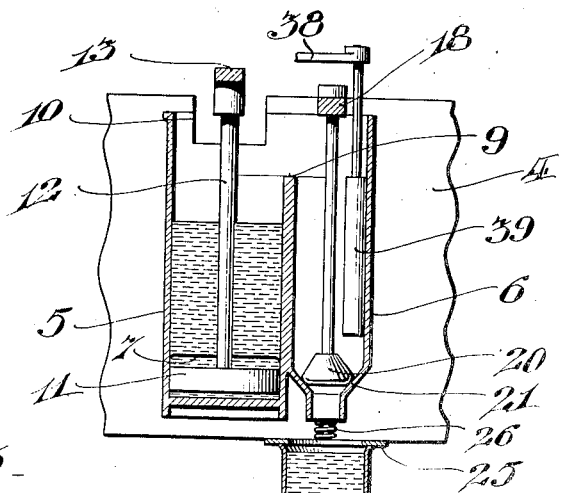
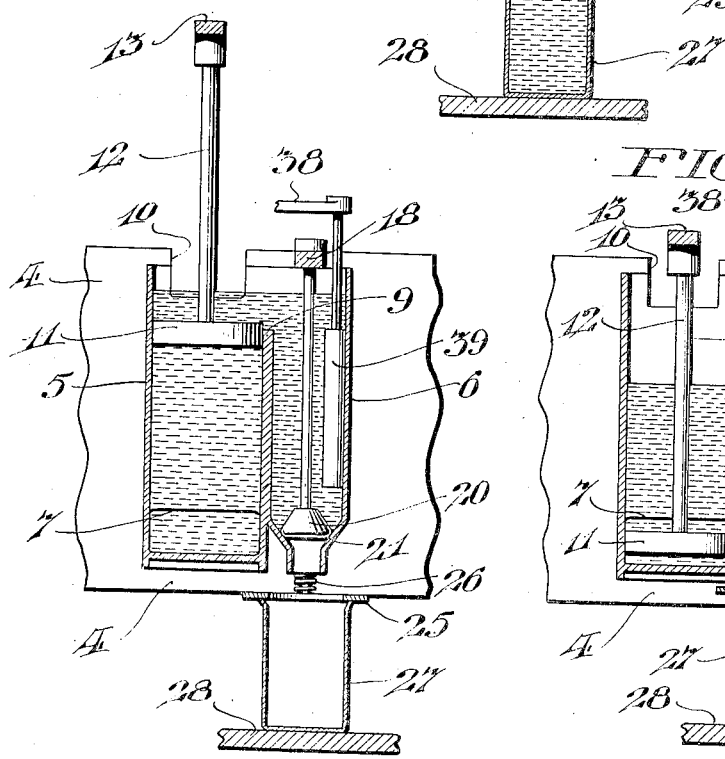
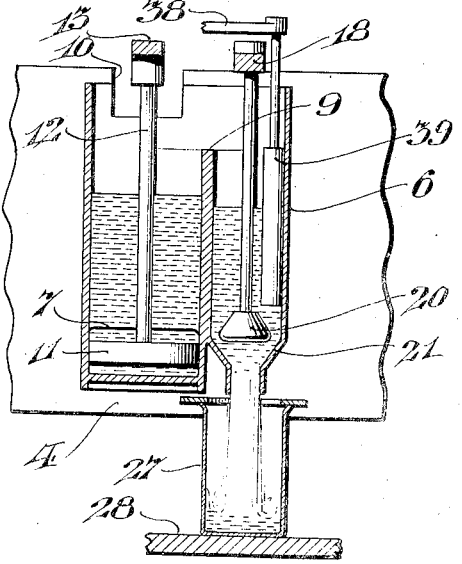
WITNESSES:
INVENTOR:
Charles H. Ayars,
BY
ATTORNEY.

Patented Sept. 4, 1928.

1,683,120

UNITED STATES PATENT OFFICE.

CHARLES H. AYARS, OF SALEM, NEW JERSEY, ASSIGNOR TO AYARS MACHINE COMPANY, OF SALEM, NEW JERSEY.

LIQUID-MEASURING VALVE.

Application filed January 16, 1926. Serial No. 81,704.

My invention relates to liquid measuring valves and more particularly to that type of valves which operate when a can is in position to be filled but are inoperative in case no can is presented for filling.

The objects of my invention are to provide an improved valve of this general type which will accurately measure the required quantity of liquid, which will operate only when a can is presented for filling, which may be readily adjusted for use with cans of different size, and to provide improved mechanism whereby the series of valves in the machine may be concurrently adjusted.

These objects, and other advantageous ends which will be described hereinafter, I attain in the following manner, reference being had to the accompanying drawings in which Figure 1 is a plan view of a canning machine embodying my invention, Figure 2 a vertical section on line 2—2 of Figure 1, Figure 3 a vertical section through one of the liquid filling and measuring units showing the valve filled and ready for discharge, Figure 4 a like view showing the valve open and the liquid flowing into a can, and Figure 5 a like view showing the can filled and the valve closed and ready to receive another charge of liquid.

Referring to the drawings, 1 indicates a vertical shaft, 2 and 3 bed plates fixed to the shaft and 4 a liquid tank fixed thereto. The tank is surrounded by a series of filling and measuring units fixed to and rotating with the tank, each unit including a filling cylinder or chamber 5 and a valve casing 6. The filling chambers communicate with the lower part of the tank by an opening 7 in the filling chamber and openings 8 in the tank. The wall separating cylinders 5 and 6 is cut away at 9 to provide for passage of liquid from cylinder 5 to cylinder 6, and the wall separating cylinder 5 from tank 4 is cut away at 10 to provide for overflow of liquid from the cylinder to the tank. A piston 11, carried by a piston rod 12, is adapted to be reciprocated in each cylinder 5. Rod 12 is connected by a cross bar 13 to an arm 14 adapted to slide in a slot 15. Arm 14 carries a roller 16 which rides on a cam track 17 in the frame.

A bar 18, disposed above each valve chamber, carries a valve stem 19 which carries a valve head 20 adapted to be seated on a seat 21 at the lower end of the valve chamber. Bar 18 also carries depending rods 22 slidable through openings in lugs 23 and 24 extending from the valve casing and attached, at their lower ends to a ring 25. Coiled springs 26, surrounding the rods and interposed between the ring and lugs 24, normally hold the valve head in closed position.

After being fed to the machine, each can 27 is carried by an independent platform 28 supported by a rod 29 slidably mounted in bed plates 2 and 3 which are connected by fixed rods 30. Plates 31, fixed to rods 29 and slidable on rods 30, carry rollers 32 which ride on a cam track 33.

For adjusting the effective capacity of the measuring valves, a head 34 having a depending sleeve 35 is slidably keyed on shaft 1 and threaded on a screw 36 provided with a hand wheel 37 and having a flat end which rests on the end of shaft 1. A series of arms 38, one for each measuring valve, extend radially from the lower part of sleeve 35, and each arm carries a displacement member 39 suspended in a valve chamber. By raising or lowering head 34 the effective capacity of the measuring valves may be increased or decreased to adapt them for use with cans of different size.

With a piston 11 in its low position, a filling cylinder 5 will be filled with liquid to the level of the liquid in tank 4. As the tank and the parts carried thereby are rotated, roller 16 travels up the incline on cam track 17 thereby raising the piston and the liquid above it and causing the liquid to flow into valve chamber 6. When the roller reaches the high point 40 of the cam, the piston will be in the position shown in Figure 3 and the cylinder 6 charged with liquid, the measured quantity of liquid including that which is above the piston. If the capacity of the cylinder is so adjusted as to require a less quantity of liquid than is carried up by the piston, the surplus liquid will overflow into the tank and only the required quantity will go to the cylinder. As roller 16 travels down the incline of the cam, the piston will be returned to its low position.

Rotation of the tank will also cause roller 32 to travel up the incline of cam track 33 thereby raising platform 28 and the can carried thereon, forcing the can into contact with the ring 25, forcing the ring upward against the tension of springs 26, and opening the valve. As the roller passes the high point 41 of the cam, springs 26 will cause the valve to close.

If a platform carries no can, the valve will remain closed and a quantity of liquid equal to that which would normally have been pumped into the cylinder is pumped into the tank without affecting the charge in the cylinder.

The cycle of operation is so timed that actuation of the valve opening mechanism follows actuation of the cylinder filling mechanism.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A liquid measuring device for filling cans including a rotatable tank; filling cylinders communicating with the tank through openings at their lower ends and having overflow openings at their upper ends; pistons in the cylinders; valve chambers adapted to hold a measured quantity of liquid and in communication with the filling cylinders; valves in the chamber for controlling the discharge therefrom; means for reciprocating the pistons, and means for opening the valves.

2. A liquid measuring device for filling cans including a rotary tank; filling cylinders communicating with the tank through openings at their lower ends; pistons in the cylinders; valve chambers in communication with the filling cylinders and adapted to hold a measured quantity of liquid; valves in the chambers for controlling the discharge therefrom; means for varying the capacity of the valve chambers; means for reciprocating the pistons, and means for opening the valves.

3. A liquid measuring device for filling cans including a rotary tank; filling cylinders communicating with the tank through openings at their lower ends; pistons in the cylinders; valve chambers in communication with the upper part of the filling cylinders; valves in the valve chambers; means for reciprocating the pistons, and means for opening the valves.

4. A liquid measuring device for filling cans including a rotary tank; filling cylinders communicating with the tank through openings at their lower ends; pistons in the cylinders; valve chambers in communication with the upper part of the filling cylinders and adapted to hold a measured quantity of liquid; valves in the valve chambers; a displacement member depending into each valve chamber whereby its capacity may be varied; means for reciprocating the pistons, and means for opening the valves.

5. A liquid measuring device for filling cans including a rotary tank; filling cylinders communicating with the tank through openings at their lower ends; pistons in the cylinders; valve chambers in communication with the upper part of the filling cylinders and adapted to hold a measured quantity of liquid; valves in the valve chambers; a displacement member depending into each valve chamber, whereby its capacity may be varied; means for raising or lowering all of the displacement members simultaneously; means for reciprocating the pistons, and means for opening the valve.

6. A liquid measuring device for filling cans including a rotatable tank having openings in its side walls near the bottom; filling cylinders connected to the periphery of the tank and having openings at their lower ends aligning with the openings in the tank and overflow openings communicating with the tank; pistons in the cylinders; valve chambers in communication with the filling cylinders and adapted to hold a measured quantity of liquid; valves in the chambers; means for reciprocating the piston, and means for opening the valves.

In testimony whereof I have signed my name to this specification.

CHARLES H. AYARS.